United States Patent [19]
Sokolow

[11] 3,910,430

[45] Oct. 7, 1975

[54] PARISON UNLOADER

[75] Inventor: Nickolas N. Sokolow, Roscoe, Ill.

[73] Assignee: Beloit Corporation, Beloit, Wis.

[22] Filed: Mar. 29, 1974

[21] Appl. No.: 456,299

[52] U.S. Cl. .................. 214/21; 198/22 R; 198/25; 214/152; 425/274
[51] Int. Cl.² ........................................ B65G 47/34
[58] Field of Search ............ 214/21, 152; 198/22 R, 198/22 B, 25, 178, 181, 185; 425/274, 436

[56] References Cited
UNITED STATES PATENTS

| | | | |
|---|---|---|---|
| 2,116,916 | 5/1938 | Van Hyning | 425/274 X |
| 2,796,164 | 6/1957 | Hakogi | 198/22 X |
| 3,773,192 | 11/1972 | Moore et al. | 214/21 |

*Primary Examiner*—Robert G. Sheridan
*Attorney, Agent, or Firm*—Dirk J. Veneman; Bruce L. Samlan; Gerald A. Mathews

[57] ABSTRACT

A device for removing a parison from a carrying means, such as for removing from the conveyor of a heating oven parisons which were missed at the normal oven discharge station. As the parisons pass through the missed parison removal station, such parisons are engaged on opposite sides, the means engaging the parison on at least one side being operable to impart axial motion to the parison to move it off of the conveyor. The means engaging and imparting axial motion to the parison may comprise a driven roller, while the means engaging the parison on the other side may comprise for example rods, rollers or the like.

27 Claims, 11 Drawing Figures

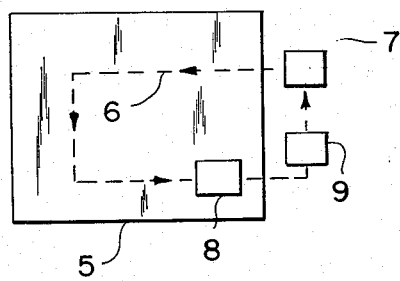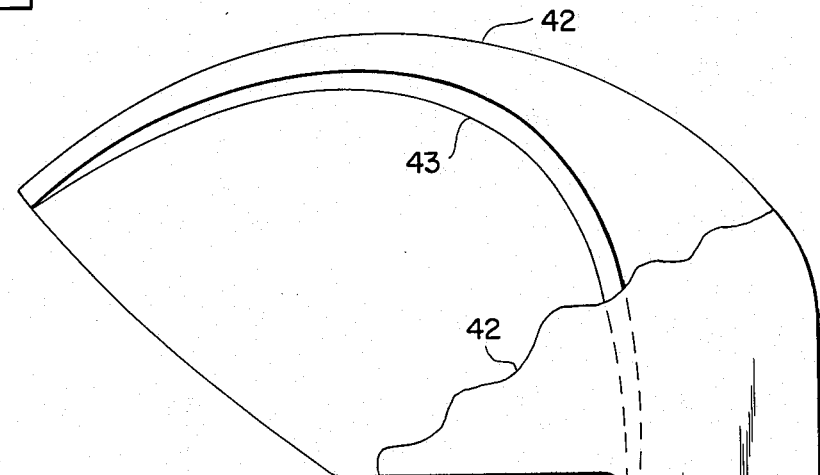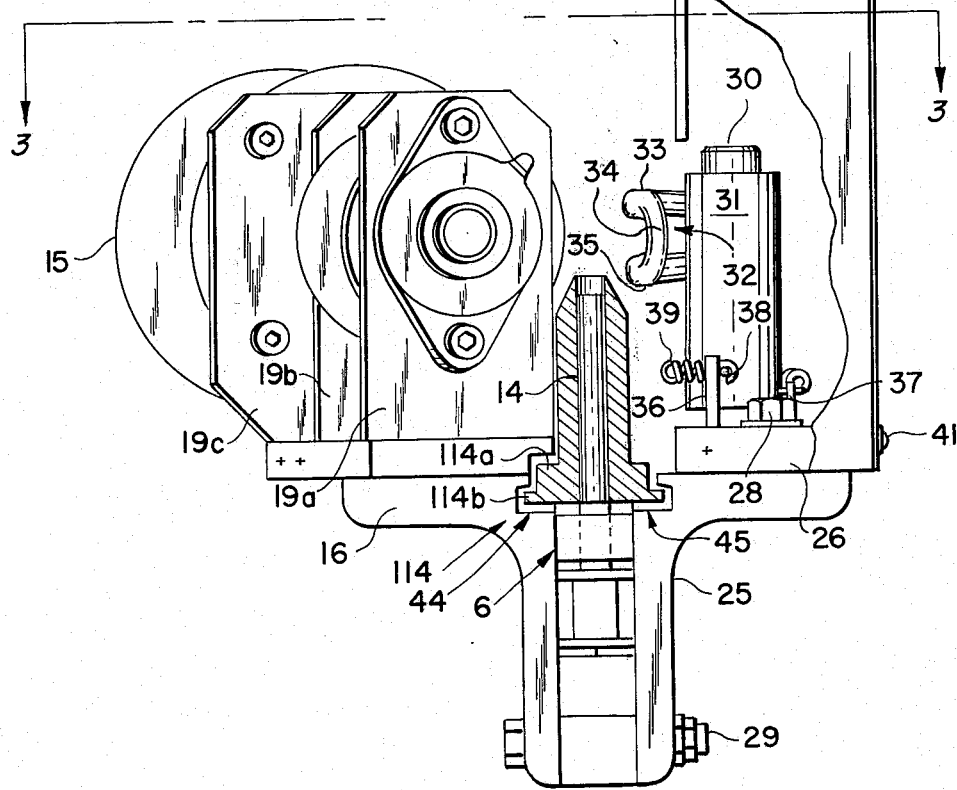

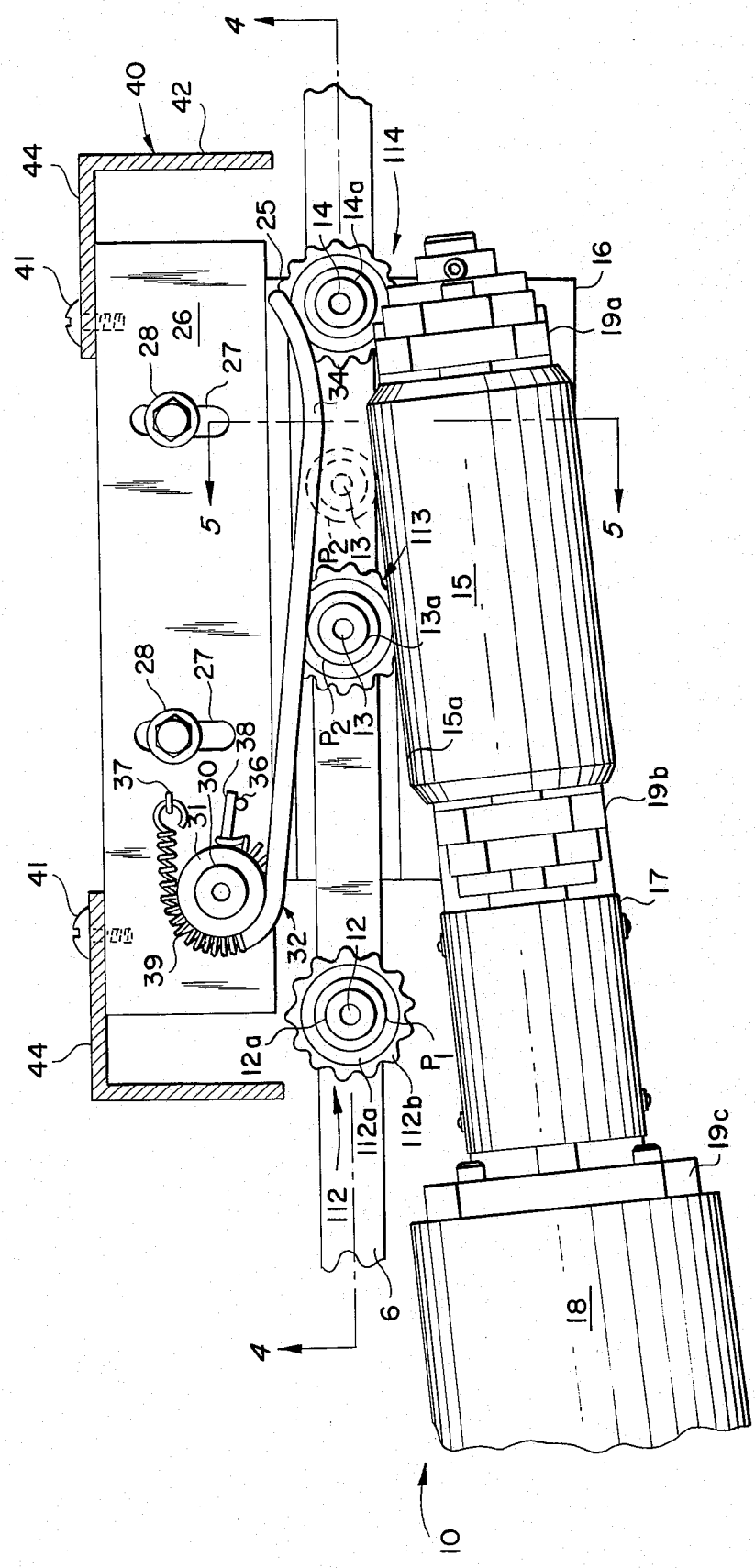

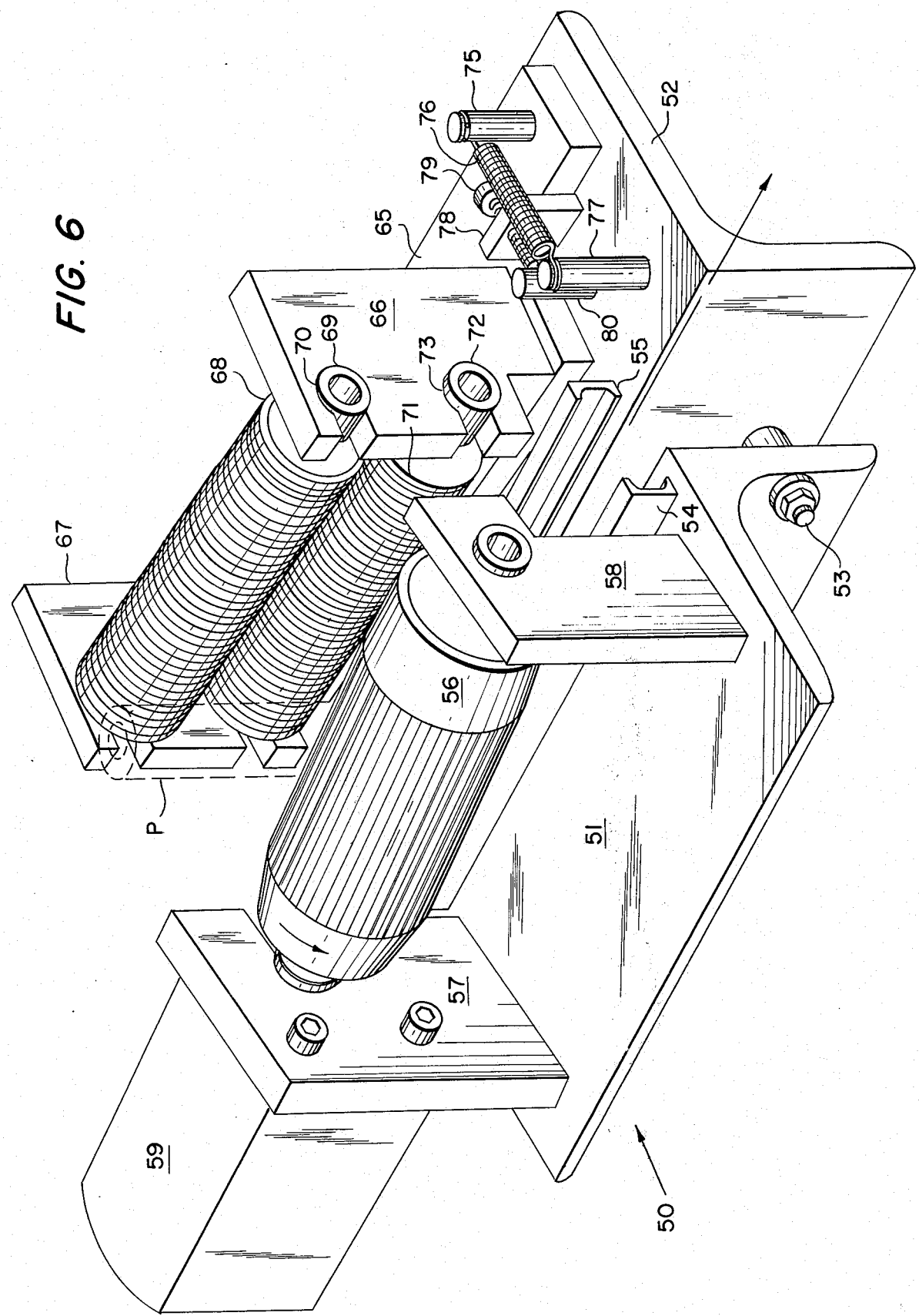

PARISON UNLOADER

BACKGROUND OF THE INVENTION

This invention relates to plastic molding such as blow molding tubular parison into finished articles, and in particular it relates to improvements in removing parisons from an oven conveyor.

In one type of plastic molding apparatus, cold parisons are heated in an oven structure and then transferred to a blow molding structure where the parisons are formed into a suitable finished article such as a container. Cold parisons, which may be of any suitable shape, are those which have been formed at some time in the past and then cooled down after forming for storage and/or transfer to another location, etc., this being in contradistinction to the well known continuously forming hot parison technique wherein the parisons, still hot from the forming process are delivered directly to the mold. An example of an apparatus for forming containers and the like from cold parisons is described in detail in U.S. Pat. No. 3,765,813 issued Oct. 16, 1973, by Lawrence A. Moore.

The parison heating oven used in the said patent includes a carrying structure in the form of an endless conveyor which has thereon a plurality of parison holders arranged to hold parisons and carry them along a predetermined path through the oven until the parisons reach a desired temperature, which temperature depends on the particular type of plastic used. The parisons enter the oven at a loading station and are removed at a discharge station. The distance along the predetermined path between the loading station and the discharge station, the speed of movement of the carrying structure and the temperature within the oven are all carefully controlled such that as each parison reaches the discharge station, it has reached this desired temperature, whereby the parisons are removed and carried to the blow mold. If a jam occurs in the apparatus, for example if the blow molding cannot be continued, the parisons will not be removed at the discharge station. However, since this type of oven is a continuously operating one and its economics of operation do not in any way permit the carrying structure to stop until the cause of the jam is removed, these parisons will simply move past the discharge station, as a result of which they will become overheated and hence not useable at this time in the blow mold. These parisons must be removed not only because they are currently incapable of being blow molded (although the parisons may ultimately be recycled) but also they must be removed to clear the parison holders before the latter reach the parison loading station whereat fresh cold parisons will be placed onto the same.

Previous structures used to remove these overheated parisons from the oven included costly and complex means such as pneumatically operated picker arms under the control of an electrical switch operated in response to a parison moving past the normal discharge station.

An improved simplified parison removing structure is disclosed and claimed in commonly owned U.S. Pat. application Ser. No. 209,201 filed Dec. 17, 1971, now U.S. Pat. No. 3,807,583, by L. L. Mauger.

In that application there is provided at a missed parison removal station an arrangement including an upwardly inclined track structure comprising a pair of rails, one on each side of the parison carrying structure. The carrying structure itself, and in particular the parison holders thereon are permitted to move completely through the removal station, and in particular through the space between the inclined rails, while the overheated parisons are lifted and removed by these inclined rails. While the improvement of this Mauger application was basically sound, it was found in practice to be less than fully effective. This resulted in a further development which provided a means for positively engaging the parisons so as to more positively and reliably lift the parisons off of the conveying structure and onto the inclined ramp. The apparatus for effecting this improvement is described in the Moore et al U.S. Pat. No. 3,773,192, issued Nov. 20, 1973.

It has now been found that these previous arrangements for removing missed parisons still suffer from certain disadvantages. The carrier pin itself is given only small clearances to complete its travel through the removal station. If for some reason a parison is not lifted upwardly, it along with its carrier pin will jam and this in turn could cause damage to the various elements of the removal structure and in particular it could bend the carrier pin. Such a bent pin could not subsequently be used for carrying a parison through the oven since any parison carried thereby would be tilted and consequently heated in a non-uniform manner. To the contrary, it is quite important in heating tubular parisons that the heat be applied uniformly. Another disadvantage of the previous arrangements indeed concerns the fact that some parisons were not positively removed. For example, some parisons would become overheated to such an extent that they become too soft to be positively removed even by the means provided in the said earlier Moore et al patent.

Consequently, there exists a need for improvements in the art of removing missed parisons which are less susceptible to damage and which are also more reliable than previously known arrangements.

SUMMARY OF THE INVENTION

Thus, it is a purpose of the present invention to provide an improvement in the art of removing missed parisons from a parison heating oven, which improvement will overcome the disadvantages of the previous arrangements.

This purpose of the present invention is achieved by providing a method and apparatus for removing a parison from a carrying means whereby the parison is removed by means which is driven independently of the parison to impart axial motion to the parison in contrast with parison arrangements wherein static portions of the carrying structure such as the inclined ramps were relied upon to effect removal, but wherein simplicity is retained in comparison with the earlier complicated and costly missed parison removing means referred to earlier in this specification. The parison is engaged by first and second engaging means on opposite sides of the parison, at least one of these means being driven independently of the parison to impart axial motion to the parison to remove it from the carrying means.

In accordance with a preferred embodiment of the present invention, as applied for example for removing missed parisons from the conveyor of a parison heating oven, as the missed parison enters the removal station, it is engaged on opposite sides, respectively, by the first and second engaging means. The first engaging means may comprise means defining two points of contact with the parison located on one side of the parison and the second engaging means may comprise means defining a third point of contact with the parison located on the opposite side of the parison heightwise between the first two points. The means which engages the parison at this third point is operable to impart axial motion to the parison such that after the parison passes the lowermost of the first two points, it will tilt and subsequently be directed over the means which engages the parison at the third point whereupon it will be removed from the oven.

In one preferred arrangement, the means which engages the parison at the third point may comprise a roller driven about its axis in a direction to lift the parison, this roller preferably having a surface including grooves, knurling or the like to enhance frictional engagement between the parison and the roller surface.

Suitable means will also be provided for engaging the parison on the side opposite from the driven roller at said first two points. In a preferred arrangement, this latter means may comprise a pair of rods extending longitudinally along the conveyor path; and in a further embodiment this latter means may comprise a pair of rollers mounted one above the other and extending longitudinally along the conveyor path across from the driven roller.

Preferably the first and second engaging means such as the driven roller on the one hand and the means providing contact at the first two points on the other hand will converge in the direction of travel towards the centerline of the conveyor path so that they form a narrowing "nip" which the parison enters in order to be removed. The first engaging means will preferably be resiliently mounted such that it can be resiliently urged away from its normal converging position by the parison passing through the removal station. The resilient force urging the first engaging means towards the centerline would be great enough to assure sufficient frictional engagement between the parison and the second engaging means such as the driven roller. One advantage of this resilient construction is that it permits the present invention to be operable for parisons having different outside diameters.

Thus, it is an object of this invention to provide a new and improved method and apparatus for removing parisons from a parison carrying means.

It is another object of this invention to provide a new and improved missed parison method and apparatus which is simplified but which nonetheless positively engages and removes the parisons.

It is still another object of this invention to provide a method and apparatus for removing parisons from a carrying means comprising first and second means engaging opposite sides of a parison, at least one of these means being driven independently of the parison to impart axial motion to the parison to remove it from its carrying means.

Still another object of this invention is to provide a method and apparatus for removing a parison from the conveyor of a parison heating oven wherein the parison is engaged by first engaging means located on one side of the parison and second engaging means located on the other side thereof, wherein the second engaging means is driven independently of the parison to remove it from the conveyor.

It is still another object of this invention to provide an arrangement for removing a missed parison including a roller on one side of the oven conveyor path which is driven independently of the parison and a pair of elongated means on the opposite side thereof, the latter being resiliently urged towards the centerline of the conveyor path.

It is still another object of this invention to provide an apparatus for removing missed parisons from the conveyor of an oven including a roller on one side of the conveyor path which is driven independently of the parison and a pair of idle rollers on the opposite side thereof, said rollers providing three point contact with the parisons being removed.

It is still another object of this invention to provide an apparatus for removing missed parisons from the conveyor of an oven including a roller on one side of the conveyor path which is driven independently of the parison and a pair of parallel rods on the opposite side thereof, the roller and the rods providing three point contact with a parison to be removed.

Other objects and the advantages of the invention will become apparent from the detailed description to follow, together with the accompanying drawings.

BRIEF DESCRIPTION OF THE DRAWINGS

There follows now a detailed description of preferred embodiments of the invention which are to be read together with the accompanying drawings wherein:

FIG. 1 is a diagrammatic view illustrating a parison heating oven and the relationship of the present invention thereto.

FIG. 2 is an end elevational view of a parison removing apparatus constructed in accordance with the present invention, with one parison holder shown in cross-section.

FIG. 3 is a horizontal sectional view taken along line 3—3 of FIG. 2.

FIG. 6 is a perspective view of another embodiment of the invention.

DETAILED DESCRIPTION OF THE PREFERRED EMBODIMENTS

Figure 4:
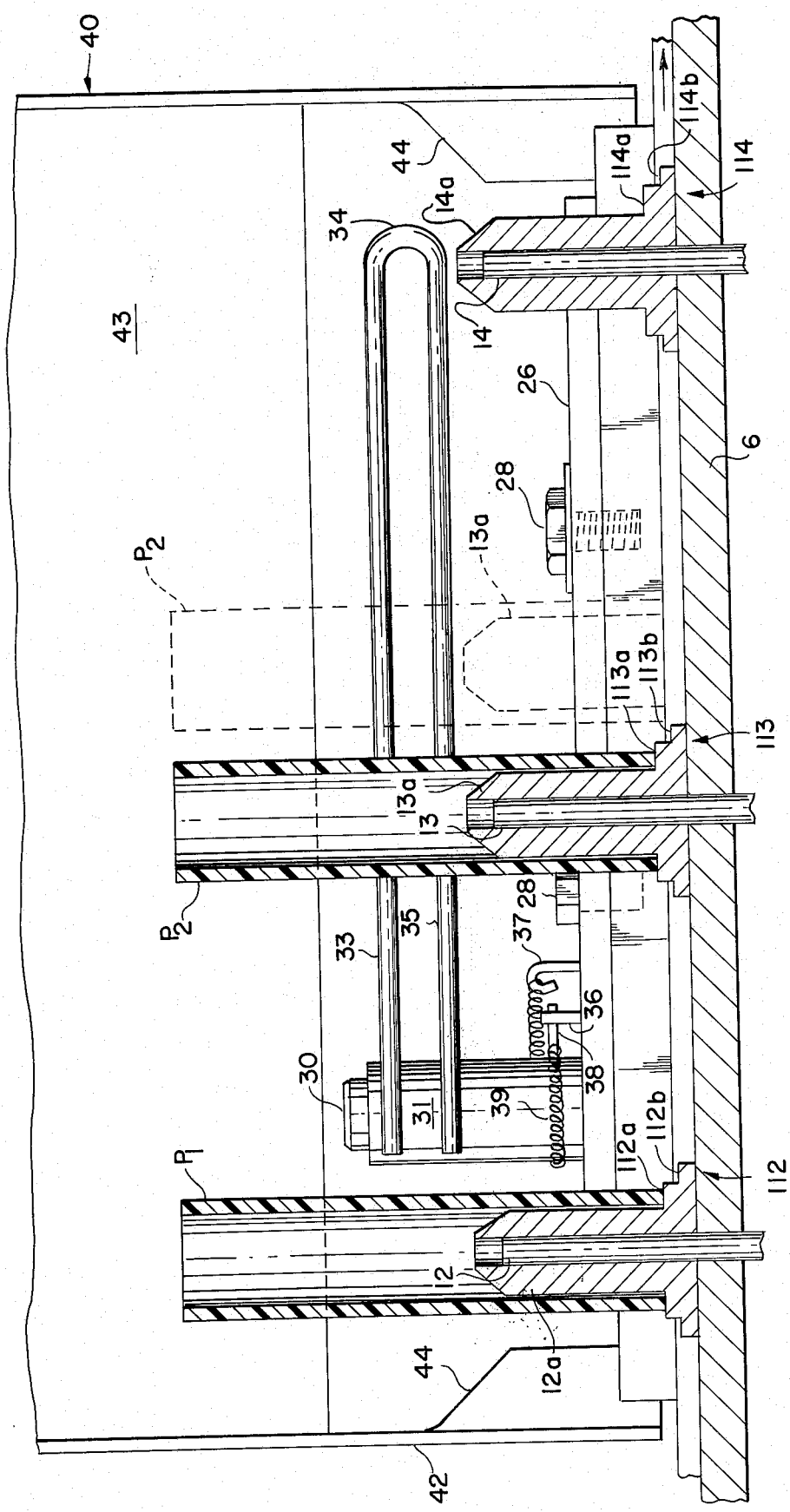
FIG. 4 is a vertical sectional view taken along line 4—4 of FIG. 3.

Referring now to the drawings, like elements are represented by like numerals throughout the several views.

FIG. 1 illustrates diagrammatically an oven 5 including therein an endless conveyor represented by the dotted line 6. Although the path through the oven is shown as being essentially rectangular, this is purely diagrammatic since in practice the path through the oven would normally be far more extensive, for example back and forth through the oven, as shown for example in the said Moore U.S. Pat. No. 3,765,813. Such an oven would include a loading station 7 at which cold parisons would be loaded onto the upright pins which are provided on the endless conveyor and spaced therealong for receiving and carrying the parison. In the Moore patent, the loading station is located in the oven. However, as shown in FIG. 1 herein, it may be desirable to locate the loading station outside of the oven itself. After the parisons have completed their travel through the oven and reached the forming temperature, they would be removed at discharge station 8 for delivery to the blow molding station. However, if for some reason a parison were not removed at discharge station 8 it would then be removed at the missed parison removal station 9 before that portion of the conveyor returned to the loading station 7. The removal station 9 will preferably but not necessarily also be located outside of the heated part of the oven.

Preferred embodiments of the removal station 9 will be illustrated and described with respect to FIGS. 2 through 9. However, it will first be noted that after the missed parisons have been successfully removed from the conveyor by the means to be described below, the removed parisons would then be deflected along an appropriate path to a receiving means. When the station 9 is outside of the oven as in FIG. 1, a deflector may perform this function. If station 9 is located in the oven, the parisons may be removed out through the bottom of the oven into an awaiting receptacle as shown for example in the said Moore et al U.S. Pat. No. 3,773,192.

Referring now to FIGS. 2 through 4, there is shown a first embodiment of a parison removing means. The endless conveyor chain 6 has pins connected thereto and extending upwardly therefrom for receiving and carrying the parisons P. Three of these pins 12, 13 and 14 are shown in FIGS. 3 and 4 with the pin 14 being visible in FIG. 2. Parison holders 12a, 13a and 14a are loosely mounted on the pins 12, 13 and 14, respectively. These holders include annular flanges 112, 113 and 114, respectively, having upper surfaces 112a, 113a and 114a, respectively, for receiving parisons and toothed portions 112b, 113b, and 114b for engaging means (not shown) alongside the conveyor for turning the holders, and hence also the parisons, about their axes as they travel through the oven to assure that the parisons are heated uniformly as they travel through the oven. The advantage of loosely mounted holders will be appreciated when it is realized that these holders must be changed each time that a job change calls for a different size parison, and that there may be as many as 500 to 600 or ever more parison holders in a given oven. Hence, parison holder changeover time is drastically reduced with loosely mounted parison holders even when compared with a structure which requires loosening only a single screw for each holder to effect each change. Pins 12 and 13 contain parisons $P_1$ and $P_2$, and a moved position of pin 13 and parison $P_2$ are also illustrated in FIG. 3, the purpose for which will be described below.

The parison removal structure includes a driven roller 15 mounted on a base 16 and connected via a coupling 17 to a motor 18. The roller and the motor are mounted via plates 19a, 19b and 19c. In a manner to be described below, the surface of the roller 15 frictionally engages the parison passing thereby at a point on one side of the parisons, engagement being accomplished along a tangent of the roller which lies in a vertical plane closest to the centerline of the conveyor, namely the line 15a visible at the uppermost portion of the roller 15 in FIG. 3. It will be noted that the axis of the roller 15 and hence also the line 15a converges in the direction of travel towards the centerline of the conveyor. An important function of this driven roller 15 is to frictionally engage the side of the parison. For this purpose, this roller can contain longitudinally extending ridges and grooves or it can be provided with other friction means such as a knurled surface. In one preferred embodiment of the invention, this roller 15 is made of stainless steel, has a 3 inch diameter and the cylindrical portion thereof which would contain the friction surface and include the line 15a would be approximately four to five inches long.

On the opposite side of conveyor 6 from the driven roller 15 there is provided a means for engaging the parisons at two points which are located respectively below and above the level of engagement by the roller 15 on the opposite side of the parisons. In the preferred embodiment of FIGS. 2 through 4, this two point engaging structure includes a base 25 which receives thereon an adjustable base plate 26. This plate is movable towards and away from the conveyor 6 by means of adjustable slots 27 which receive bolts 28 which tighten onto plate 26 and are threadedly received in base 25. The base pieces 16 and 25 are secured together by suitable means such as bolts 29.

A pin 30 is mounted on the base plate 26 and is rigid with respect thereto. Surrounding this fixed pin is an annular pin 31 which is turntable about the pin 30. A two point contact rod means 32 is fixed to the annular pin 31 such as by welding or the like. This rod means extends outwardly therefrom and includes an upper leg 33, a lower leg 35 and a U-shaped portion at the outer end thereof interconnecting the legs 33 and 35. A pin 36 and a hook 37 are fixed onto the base 26 and a further pin 38 is fixed to the annular pin 31. A tension spring 39 is secured at one end to the fixed hook 37 from which it wraps around the pin 31 to its other end where it is secured onto the pin 38. Therefore, as will be evident from the figures, this spring normally urges the pin 31 in a clockwise direction to a normal rest position at which the pin 38 engages the pin 36. However, the pin 31 as well as the rod means 32 are capable of limited turning movement in the counterclockwise direction opposing the force of spring 39. It will further be noted that in the normal rest position the rods 33 and 35 of the rod means 32, like the line 15a converge in the direction of travel of the conveyor towards the centerline of the conveyor. The rods 33 and 36 may be made of any suitable material and in one embodiment they are made of stainless steel. The surfaces thereof should of course be constructed so as to permit sliding movement vertically with respect thereto under the frictional force exerted to the parisons by the roller 15.

Also shown in FIGS. 2 through 4 is a deflecting hood 40 which will assist in deflecting the removed parisons up and over the roller 15 (in a manner to be described in greater detail below). This hood includes a pair of side plates 42 having flanges 44 which turn inwardly so as to provide a location at which nuts 41 firmly secure the hood by threaded engagement with the back of plate 36. Extending from one side plate 42 to the other and rigidly connected thereto is a curved baffle plate 43, the surface of which is constructed to receive and redirect the parisons out to the left of apparatus 10 (as viewed in FIG. 2) whereupon the removed parison will fall into a suitable receiving means.

As noted earlier, it is advantageous to use parisons holder which are loosely mounted on their respective pins. However, this creates the danger that the holders will be picked up with the parisons at the missed parison removal station. To prevent this, there is provided at this station a pair of channels 44 and 45 formed in the bases 16 and 25, respectively, (see FIG. 2) for engaging some portion of the upper surface of annular flanges 112, 113 and 114 to prevent upward movement thereof as the parisons are engaged and removed from their respective holders.

The operation of the embodiment of FIGS. 2 through 4 will be explained below with reference to FIGS. 5A through 5C in addition to FIGS. 2 through 4. As illustrated in the drawings, the pins containing parisons enter the removal station from the left (as in FIGS. 3 and 4). The pins with the parisons thereon enter the nip formed between the line 15a and the rod means 32. For reasons to be explained below, the rod means 32 are positioned closer to the conveyor centerline than the line 15a so that the parisons engage the rods 33 and 35, urging them counterclockwise about the pin 30, before engaging the roller 15. A point is then reached, as indicated in the dotted line position of pin 13, at which parison $P_2$ engages line 15a of roller 15 so that the parison is then engaged at three points as illustrated in FIG. 5A. The three points include the line 15a and the contacting surfaces of rods 33 and 35. The meaning of the term "point" should be clarified. Theoretically, since the parisons are cylinders and the touching tangent lines of rods 33 and 35 and the line 15a are lines, there would theoretically be contact at the three points where these three lines were tangent with and hence contacted the cylindrical parison. In practice, however, it will be understood that these parisons are plastic material in a relatively soft state when they reach the removal station so that in practice these touching tangent lines of the elements 33, 35 and 15 will of course slightly deform the cylindrical surface of this otherwise cylindrical parison so that the actual contact points will more accurately be lines extending for a small but finite distance. It will be understood that the term "point" contact of course includes such "line" contact.

Figure 5C:
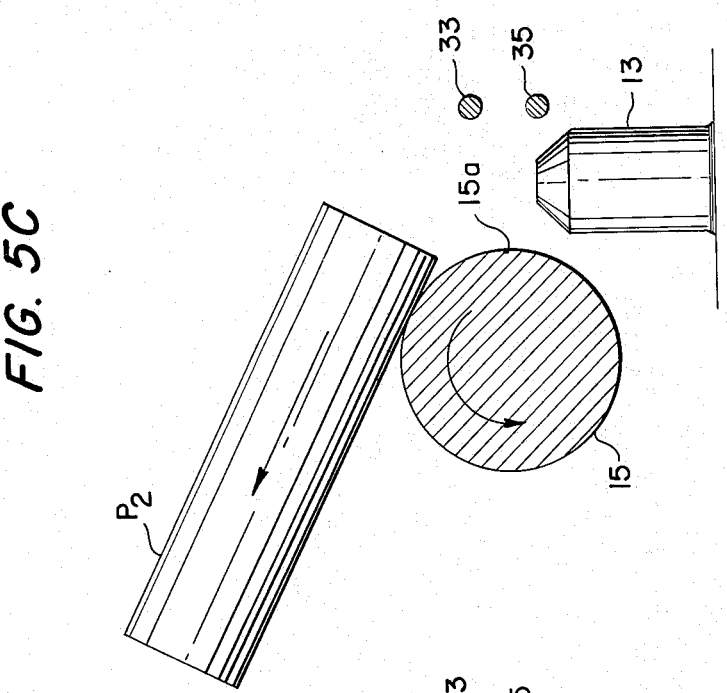
FIGS. 5A, 5B and 5C illustrate the operation of the embodiment of FIGS. 1 through 4, illustrating certain parts taken along line 5—5 of FIG. 3.
Figure 5B:
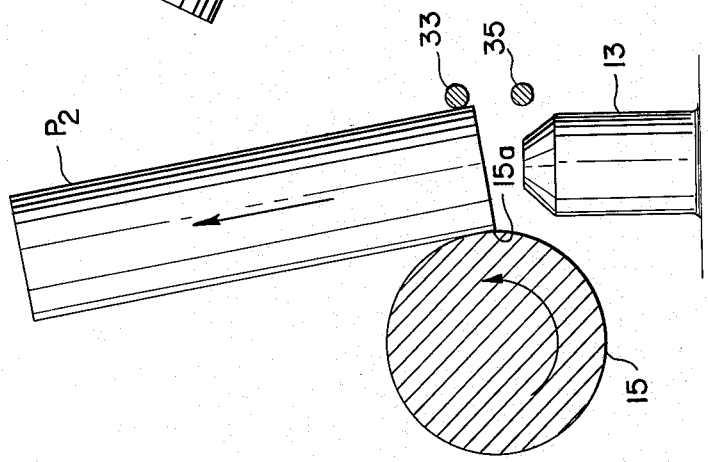
Figure 5A:
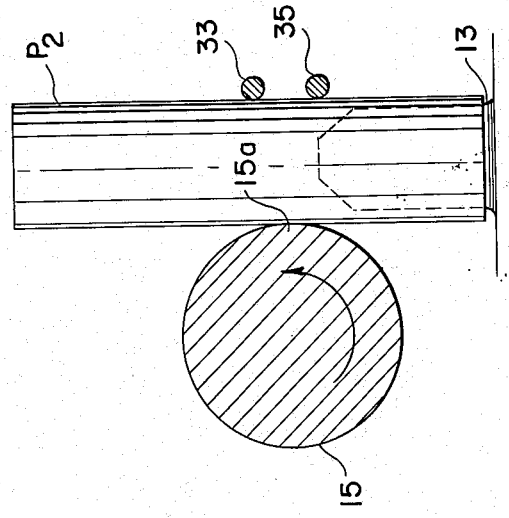

FIGS. 5A through 5C illustrate the movement of the various parts of the parison for removing the latter in approximately the position of the dotted line pin 13 in FIGS. 3 and 4. Initially, the parison $P_2$ is engaged at three points as illustrated in FIG. 5A. Motion of roller 15 will raise the parison $P_2$ but since it is engaged by both rods 33 and 35, its initial movement will be straight up. This will of course provide the least stress on the carrying pin which would of course not be the case if a lateral force were initially applied to the parison. When the parison has risen enough so that the bottom thereof is essentially clear of the pin, the bottom thereof will pass above the lower rod 35 whereupon the three point contact becomes two point contact as indicated in FIG. 5B and at this time the parison P tilts about the roller 15. Finally, the bottom of the parison passes the rod 33 whereupon the roller 15 carries the parison P up and over it whereupon, with the assistance of baffle plate 43 the parison is delivered into the receiving means.

As noted above the rod means 32 is capable of moving resiliently away from the centerline of conveyor 6. This provides several advantages. Firstly, this will permit the present mechanism to accomodate parisons of different diameters. The larger the parison diameter, the sooner it would engage the rod means 32 and start urging the same resiliently in the counterclockwise direction, and of course the sooner it would engage the roller 15. It will be noted that in operation these pins move very slowly through the oven, for example approximately two feet per minute. Consequently, the entire removing procedure illustrated in FIGS. 5A through 5C takes place along a relatively short distance of travel of the conveyor. This will explain why small diameter parisons as illustrated in the figures, which do not reach three point contact until near the end of the converging nip formed by line 15a and rod means 32 will nontheless have ample time for completion of the removing process. Also, this will explain why larger diameter parisons which will engage the rod means 32 and the roller 15 far upstream from the engagement point shown in FIG. 3 will easily the removed before the pin travels to the more narrow portion of the nip whereat such a large diameter parison might be undesirably squeezed.

The resilient nature of the rod means 32 provides a further advantage in combination with the positioning of the rod means 32 closer to the conveyor centerline than roller 15. It has been found that with the rod means 32 and roller 15 equidistant from the conveyor centerline, the parisons might first engage the surface of roller 15 and vibrate, i.e. chatter. This occurs because the roller attempts to lift the parison upwardly but because there is no backing for the parison, it starts to rise and then it falls back down onto its holder and hence "vibrates" or "chatters" until backing is provided against the side of the parison opposite from the roller 15 by means of the rod means 32. Hence, by locating 32 closer to the conveyor centerline than 15, it is assured that the parisons will initially engage the resilient rod means which then resiliently urge the parisons against the drive rollers upon engagement with the latter, whereby this vibration or chattering is eliminated.

Figure 7:
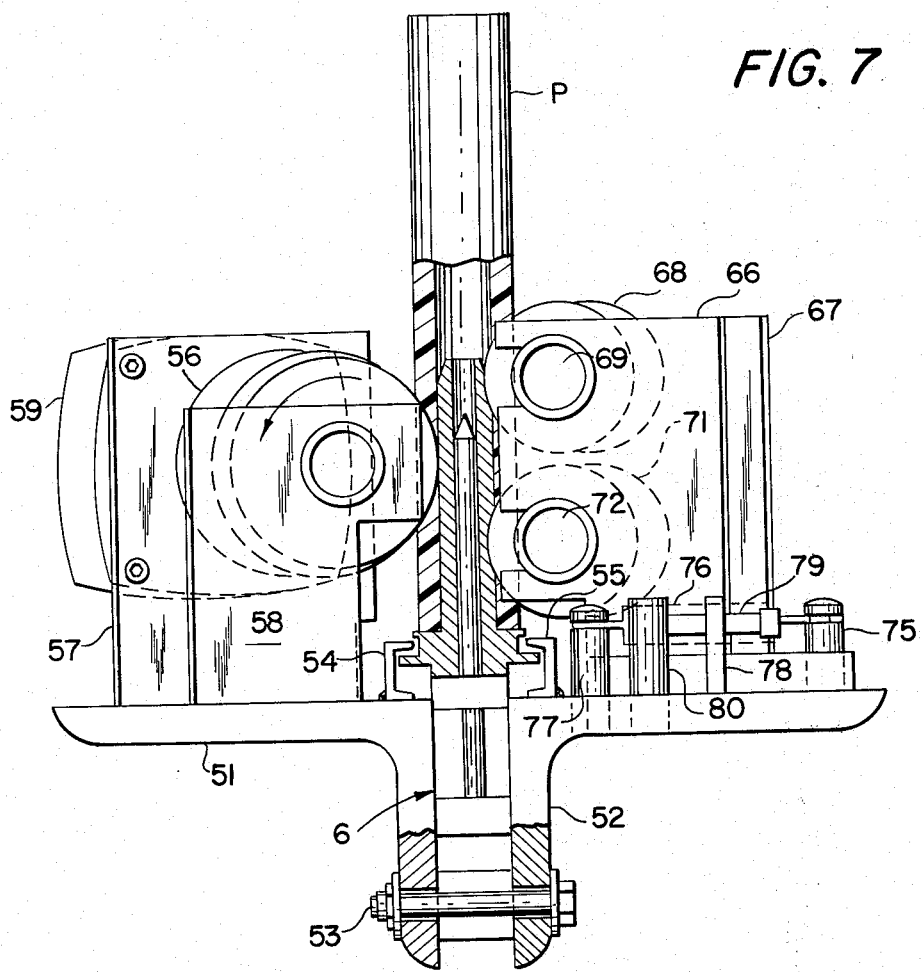
FIG. 7 is an end elevation view of FIG. 6, wherein a parison, its holder and the conveyor have been added.
Figure 9:
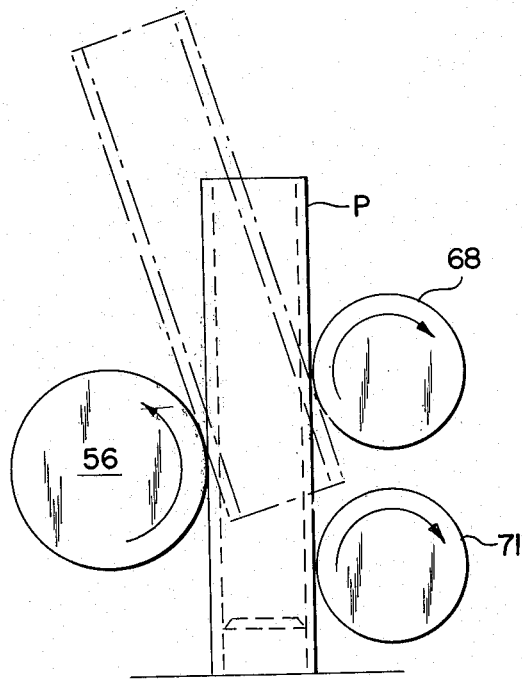
FIG. 9 is a diagrammatic view illustrating the operation of the embodiment of FIGS. 6 through 8.

FIGS. 6 through 9 illustrate another embodiment of the invention. The first embodiment described in FIGS. 2 through 4 is preferred essentially because the two point contact means including the rod means 32 is less expensive, more simplified and also more responsive because of its lighter weight. However, there may be occasions when a more positive two point engagement means would be desirable. For this purpose one may utilize the alternative embodiment shown in FIGS. 6 through 9 which is essentially the same as the embodiment of FIGS. 2 through 5, the main difference being that the rod type two point connecting means are replaced by a pair of rollers. For such more positive drive, one would drive one or both of the pair of rollers. However, for convenience these will be described hereinafter as idle rollers. Referring to the drawings, this further embodiment 50 includes a first base 51 and a second base 52, these base pieces being interconnected by suitable means such as bolt 53. In the description of this alternative embodiment the conveyor has been deleted from FIGS. 6 and 8 for purposes of clarity but the conveyor is shown in FIG. 7 along with a parison P and its holder and pin, all of which are as described with respect to FIGS. 2–5. FIGS. 6 and 7 also shown channels 54 and 55 for receiving the parison holder flanges for the same purpose as channels 44 and 45 in FIGS. 2–5.

A driven roller 56 similar to roller 15 is journaled in plates 57 and 58 which are fixed to the base 51 and there is provided a suitable motor 59 for driving the roller 56.

On the opposite side of the conveyor path there is provided a mounting plate 65 pivotally mounted on the base 52 at pivot pins 64. Fixed onto mounting plate 65 are upright plates 66 and 67. Two rollers 68 and 71 are rotatably journaled in the plates 66 and 67. In the figures shaft ends 69 and 72 of the rollers 68 and 71, respectively, are illustrated as being journaled in slots 70 and 73 of the plate 66, respectively. As in the case of FIGS. 2-4, the rollers 68 and 71 are positioned to engage the parison before they engage roller 56.

A tension spring 76 is connected on one hand to a pin 77 fixed to the base 52 and on the other hand to a pin 75 fixed on the plate 65. The limit of this resilient movement is established by engagement of a set screw 79 against a pin 80, the latter being fixed on the base 52 and the former being threadedly engaged with a block 78 which is rigid with the plate 65.

In a preferred embodiment, these rollers 68 and 71 may be provided with circumferential grooves and ridges or other frictional surfaces such as knurling or the like so as to frictionally engage the parisons and move them longitudinally as they are being lifted by frictional engagement with roller 56. In one preferred embodiment these idle rollers 68 and 71 are made of aluminium and are grooved as illustrated in FIG. 6 for an axial distance of approximately five inches with the grooves occurring approximately twelve per inch, the rollers having a two inch diameter in the area of the grooves.

Figure 8:
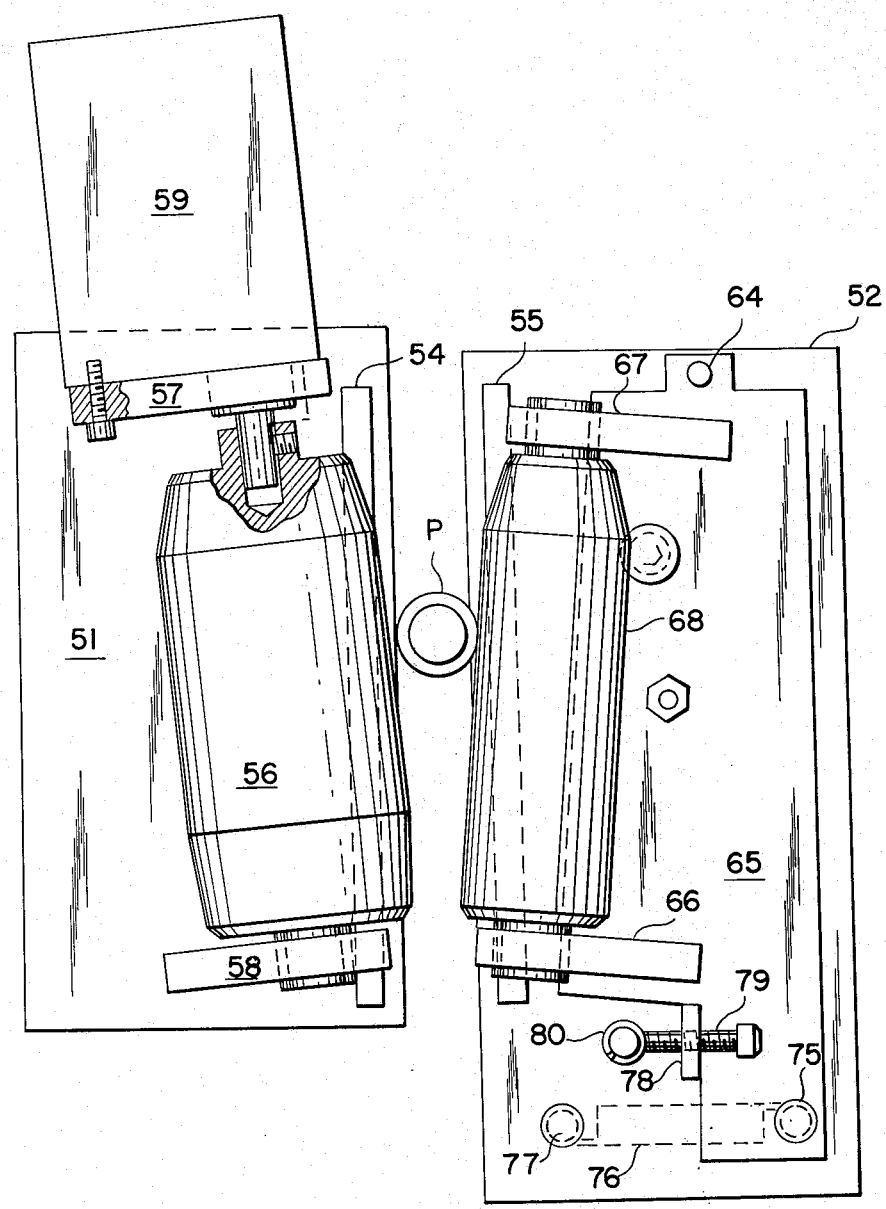
FIG. 8 is a plan view of FIG. 6.

The operation of the FIG. 6-8 embodiment is virtually identical to the operation of the earlier described embodiment so that a further description thereof is not necessary. However, certain points should be noted. The two point contact means comprising the rollers 68 and 71 is movable resiliently away from the centerline of the conveyor path in essentially the same manner and for essentially the same purposes as with respect to the first embodiment. However, with this second embodiment, the mass and hence the inertia of the structure including the rollers is much greater than with the rods so that this resilient movement will be somewhat slower and less responsive than with the first embodiment. However, as indicated above, either one or both of these rollers 68 and/or 71 may be positively driven to render the parison removing step more positive.

FIG. 8 illustrates the movement of the parison. Initially the parison is lifted upwardly by the driving movement provided by roller 56 and the subsequent idling movement of the two rollers 68 and 71. When the parison passes above the lower roller 71 it will tilt and then when it passes the upper roller 68 it will continue up and over the roller 56 to the receiving means.

Although the invention has been described in considerable detail with respect to preferred embodiments thereof, it will be apparent that the invention is capable of numerous modifications and variations apparent to those skilled in the art without departing from the spirit and scope of the invention as defined in the claims.

I claim:

1. A device for removing a parison from a carrying means comprising:
    first engaging means for engaging a first peripheral portion of a parison,
    second engaging means for engaging a second peripheral portion of said parison,
    said second peripheral portion being at any location peripherally opposed to said first peripheral portion,
    said second engaging means being driven independently of said parison to engage said parison to impart axial motion to said parison in a direction away from said carrying means,
    resilient means for urging the first engaging means towards the carrying means and permitting resilient movement of the first means away therefrom,
    said first and second means comprising elongated members generally extending in the direction of travel of the carrying means and converging towards each other in said direction of travel to form a nip which the parison enters.

2. A device according to claim 1, said first means comprising a roller, a tangent of which extends alongside the carrying means, and means for driving the roller independently of the carrying means.

3. The invention of claim 1, including an oven for heating parisons, means for mounting said carrying means for carrying parisons through the oven to heat the parisons, and said first and second engaging means located at a removing station associated with the oven.

4. A device for removing a parison from a carrying means comprising:
    first engaging means for engaging a first peripheral portion of a parison,
    second engaging means for engaging a second peripheral portion of said parison,
    said second peripheral portion being at any location peripherally opposed to said first peripheral portion,
    said second engaging means being driven independently of said parison to engage said parison to impart axial motion to said parison in a direction away from said carrying means,
    an oven for heating parisons, means for mounting said carrying means for carrying parisons through the oven to heat the parisons, and said first and second engaging means located at a removing station associated with the oven,
    said first engaging means including means for engaging a parison at a first two points located on one side of the parison and the second engaging means includes means for engaging the parison at a third point located on the other side of the parison at a third point located on the other side of the parison at a vertical level between the said first two points, said second engaging means including driven means having a part thereof engaging the parison at said third point for lifting a parison while the parison is engaged by said engaging means at said three points.

5. The invention of claim 4, wherein the said part of the driven means is located along a line which converges towards the centerline of the path of the carrying means, and wherein said first engaging means further includes a structure located across the path from the driven means and including two parallel linear portions, one above the other, which linear portions constitute means for engaging the parison at said first and second points and which converge towards the centerline of the path, wherein said driven means and said structure form a nip into which the parison is received as it is being removed.

6. The invention of claim 5, said driven means comprising a roller, and wherein that part of the roller passing through a tangent closest to the centerline of the path constitutes the said part, the roller being rotatable about its axis for lifting parisons.

7. The invention of claim 6, including resilient means for resiliently urging towards the centerline at least the downstream converging part of said structure, wherein said downstream converging part is resiliently urged away from its normal position by a parison as it is being removed.

8. The invention of claim 7, said parallel linear portions of the structure comprising a pair of parallel rods.

9. The invention of claim 8, including a pin rotatable about a vertical axis, said rods attached to the pin and extending therefrom b ngitudinally of the path and converging towards the path centerline, and spring means for resiliently urging the rods towards a rest position wherein the rods can be resiliently moved back from said rest position by parisons passing through the removing station.

10. The invention of claim 7, said structure including a frame, a pair of idle rollers mounted on said frame, one above the other, the parts of the two idle rollers passing through their respective tangents closest to the centerline of the path constituting said parallel linear portions.

11. The invention of claim 10, said resilient means including means for mounting the frame for pivotal movement about an axis such that at least the downstream ends of the rollers are resiliently urged to a rest positon and are capable of being resiliently urged away therefrom by parisons passing through the removing station.

12. The device of claim 1, said first engaging means comprising a pair of parallel rods extending along one side of the path of the carrying means so as to contact a parison at said first portion, and said second engaging means comprising a driven roller extending along the opposite side of the path, the part of the driven roller passing through a tangent closest to the path centerline engaging said second portion of the parison.

13. The device of claim 12, said driven roller and said rods converging towards the path centerline in the direction of parison travel to form a nip into which the parison is frictionally received.

14. The device of claim 13, including resilient means for resiliently urging the downstream end of said rods in a direction towards the path centerline.

15. A device for removing a parison from a carrying means comprising:
first engaging means for engaging a first peripheral portion of a parison,
second engaging means for engaging a second peripheral portion of said parison,
said second peripheral portion being at any location peripherally opposed to said first peripheral portion,
said second engaging means being driven independently of said parison to engage said parison to impart axial motion to said parison in a direction away from said carrying means,
said first engaging means comprising a pair of parallel rods extending along one side of the path of the carrying means so as to contact a parison at said first portion, and said second engaging means comprising a driven roller extending along the opposite side of the path, the part of the driven roller passing through a tangent closest to the path centerline engaging said second portion of the parison,
a pin rotatable about a vertical axis, said rods attached to the pin and extending therefrom longitudinally of the path and converging towards the path centerline, the said driven roller also converging towards the path centerline so as to form with the rods a nip into which a parison is frictionally received, spring means for resiliently urging the rods towards a rest position wherein the rods can be resiliently moved back from said rest position by a parison passing thereby.

16. A device for removing a parison from a carrying means comprising:
first engaging means for engaging a first peripheral portion of a parison,
second engaging means for engaging a second peripheral portion of said parison,
said second peripheral portion being at any location peripherally opposed to said first peripheral portion,
said second engaging means being driven independently of said parison to engage said parison to impart axial motion to said parison in a direction away from said carrying means,
said first engaging means comprising a pair of parallel axis idle rollers mounted one above the other, the parts thereof passing through a tangent closest to the centerline of the carrying means path constituting linear portions which contact a parison at said first peripheral portion, and said second engaging means comprising a driven roller extending along the opposite side of the path, the part of the driven roller passing through a tangent closest to the said path centerline engaging the said second portion of the parison.

17. The device of claim 16, said driven roller and said idle rollers converging towards the path centerline in the direction of parison travel to form a nip into which a parison is frictionally received.

18. The device of claim 17, including resilient means for resilient urging the downstream end of said idle rollers away from the path centerline.

19. The device of claim 18, said first engaging means including a frame, the idle rollers mounted one above the other on the frame, and said resilient means including means for mounting the frame for pivotal movement about an axis such that at least the downstream ends of the idle rollers are resiliently urged to a rest position and capable of being resiliently urged away therefrom by a parison passing thereby.

20. The device of claim 19, including means for adjusting the normal rest position of the frame relative to the path centerline.

21. The device of claim 16, including axially extending grooves and ridges in the surface of the driven roller.

22. The device of claim 21, including circumferentially extending grooves and ridges in the surfaces of the idle rollers.

23. The device of claim 1, wherein said carrying means comprises an endless conveyor having parison supporting pins extending upwardly therefrom and spaced therealong, said first and second engaging means being positioned relative to the carrying means such that parisons carried on the pins engage the first engaging means before engaging the second engaging means.

24. The device of claim 1, wherein said carrying means comprises an endless conveyor having parison supporting pins extending upwardly therefrom and spaced evenly therealong, parison holders loosely mounted on said pins, and including means for preventing upward movement of the parison holders as the parisons are removed therefrom.

25. In a method of removing a tubular parison from a position surrounding a pin of a pin type conveying means, said conveying means going through a heating oven, comprising the steps of:

engaging and resiliently urging the parison on one side thereof in a manner tending to move the parison laterally, and simultaneously, from the other side of the parison, imparting an axial motion to the parison in a direction away from the conveying means to strip the parison from said pin.

26. The method of claim 25, said engaging step including engaging a parison at essentially three points which points lie in a common plane which is essentially transverse to the direction of travel of the conveyor, the first two points lying on one side of the parison and the third lying on the other side and located heightwise between the first two points, and said imparting step including positively lifting the parison by exerting an upward force thereon at the said third point of engagement so that when the bottom of the parison raises above the lower of the first two points, it will tilt towards the direction of the third point.

27. The method of claim 26, wherein the means engaging the parison at the third point is a roller, a tangent of which contacts the parison at the third point, and said lifting step includes turning the roller about its axis.

* * * * *